US011457111B2

(12) United States Patent
Xu et al.

(10) Patent No.: US 11,457,111 B2
(45) Date of Patent: Sep. 27, 2022

(54) METHOD AND APPARATUS FOR VERIFYING THE CORRECTNESS OF A ROAMING ACCOUNT BALANCE

(71) Applicant: Huawei Technologies Co., Ltd., Shenzhen (CN)

(72) Inventors: Baolei Xu, Nanjing (CN); Yuanyuan Zhang, Nanjing (CN); Teng Shi, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/104,755

(22) Filed: Nov. 25, 2020

(65) Prior Publication Data
US 2021/0084174 A1  Mar. 18, 2021

Related U.S. Application Data

(63) Continuation of application No. PCT/CN2019/075623, filed on Feb. 21, 2019.

(30) Foreign Application Priority Data

May 31, 2018 (CN) .......................... 201810552138.0

(51) Int. Cl.
*H04M 15/00* (2006.01)
*H04W 4/24* (2018.01)
*H04W 8/04* (2009.01)

(52) U.S. Cl.
CPC ....... *H04M 15/8038* (2013.01); *H04M 15/66* (2013.01); *H04M 15/852* (2013.01);
(Continued)

(58) Field of Classification Search
CPC ............. H04M 15/8038; H04M 15/66; H04M 15/852; H04M 2215/34; H04W 4/24; H04W 8/04
See application file for complete search history.

(56) References Cited

U.S. PATENT DOCUMENTS 10,587,760 B1\* 3/2020 Paran ..................... H04M 15/30
11,122,500 B2\* 9/2021 Salgueiro .............. H04W 48/14
(Continued)

FOREIGN PATENT DOCUMENTS

| CN | 103686652 A | 3/2014 |
| CN | 103888926 A | 6/2014 |

(Continued)

OTHER PUBLICATIONS

Jianchao, X., "Blockchain will change carriers' operation mode", Communication enterprise management, Aug. 10, 2017, total 5 pages, English Abstract.

*Primary Examiner* — Pakee Fang
(74) *Attorney, Agent, or Firm* — Slater Matsil, LLP

(57) ABSTRACT

This application discloses a roaming charging method and apparatus. A blockchain network stores information related to roaming fee settlement, to reduce a possibility that the information related to roaming fee settlement is tampered with. In addition, a digital signature algorithm is used to sign roaming service statistics to generate an abstract, to further prevent the roaming service statistics from being tampered with. In this way, when a home carrier verifies a roaming account balance by using the roaming service statistics and a roaming charging rule, accuracy of a verification result can be ensured, and the home carrier can obtain an accurate roaming fee of a user.

22 Claims, 5 Drawing Sheets

(52) U.S. Cl.
CPC ............... *H04W 4/24* (2013.01); *H04W 8/04* (2013.01); *H04M 2215/34* (2013.01)

(56) References Cited

U.S. PATENT DOCUMENTS

2011/0103232 A1     5/2011   Sood
2015/0223042 A1     8/2015   Li

FOREIGN PATENT DOCUMENTS

| CN | 107027111 A | | 8/2017 | |
|----|-------------|---|--------|------------|
| CN | 107294738 A | * | 10/2017 | ........ H04M 15/8038 |
| CN | 107995003 A | | 5/2018 | |

\* cited by examiner

METHOD AND APPARATUS FOR VERIFYING THE CORRECTNESS OF A ROAMING ACCOUNT BALANCE

CROSS-REFERENCE TO RELATED APPLICATIONS

This application is a continuation of International Application No. PCT/CN2019/075623, filed on Feb. 21, 2019, which claims priority to Chinese Patent Application No. 201810552138.0, filed on May 31, 2018. The disclosures of the aforementioned applications are hereby incorporated by reference in their entireties.

TECHNICAL FIELD

The present invention relates to the communications field, and in particular, to a roaming charging method and apparatus.

BACKGROUND

Roaming means that when a user moves out of a network range of a home carrier, the user continues to use telecom services such as voice services, short message services, and data services through a network of another telecom carrier, so that communication can be maintained without interruption.

At present, a roaming charging solution includes two types: home charging based on visited routing and visited charging based on visited routing. In the visited charging based on visited routing solution, a visited policy and charging enforcement function (PCEF) is responsible for collecting roaming service statistics in a process in which a user uses a roaming service; and a visited online charging system (OCS) is responsible for receiving the roaming service statistics sent by the visited PCEF, and performing charging and settlement based on a roaming charging rule for and the roaming service statistics of the user.

The applicant finds that a home carrier can only obtain a roaming fee of the user and service volume information (such as call duration and data traffic) used by the user during roaming, but the home carrier cannot determine whether the roaming fee and the service volume information used by the user during roaming are tampered with. In this case, the home carrier and the visited carrier cannot perform account checking, and cannot verify accuracy of the roaming fee of the user. In addition, the roaming service statistics of the user are stored in a database of the visited carrier, and data in the database may be tampered with. In conclusion, in the current roaming charging method, the home carrier cannot accurately obtain a roaming fee of a user during roaming.

SUMMARY

A technical problem to be resolved in this application is to provide a roaming charging method and apparatus, to ensure that a home carrier can accurately obtain a roaming fee of a user during roaming.

According to a first aspect, this application provides a roaming charging method, including: receiving, by a home charging device from a blockchain network, one or more of a roaming account balance, a roaming charging rule, and a roaming service statistics abstract that are for a user; receiving, by the home charging device, roaming service statistics for the user from a service statistics database; and if an abstract obtained based on the roaming service statistics for the user is the same as the roaming service statistics abstract, verifying, by the home charging device based on the roaming service statistics and the roaming charging rule, correctness of the roaming account balance.

The service statistics database may be deployed in a visited carrier (for example, located in a visited charging device or a visited service statistics collection device), or may be deployed in a third-party system. This is not limited in this embodiment of the present invention. The roaming service statistics indicates metrical information (such as call duration, data traffic, and a quantity of messages) of the user when the user uses a roaming service in the visited carrier.

In this embodiment of this application, the roaming account balance, the roaming charging rule, and the roaming service statistics abstract are stored in the blockchain network by using a blockchain technology, and whether service statistics are tampered with is determined by comparing the roaming service statistics in the service statistics database with the roaming service statistics abstract in the blockchain. In this way, the home charging device can determine accuracy of a verification result when verifying the roaming account balance by using the roaming charging rule and the roaming service statistics abstract, so that the home charging device can accurately obtain a roaming fee for the user in a visited area, thereby improving accuracy of charging.

In a possible design, a home charging device receives one or more of a roaming account balance, a roaming charging rule, and roaming service statistics that are for a user from the blockchain network. The home charging device receives the roaming service statistics for the user from a service statistics database. When the roaming service statistics from the blockchain network are the same as the roaming service statistics from the service statistics database, the home charging device verifies correctness of the roaming account balance based on the roaming service statistics and the roaming charging rule.

In a possible design, before the receiving, by a home charging device, one or more of a roaming account balance, a roaming charging rule, and a roaming service statistics abstract that are for a user from a blockchain network, the method further includes: sending, by the home charging device, a request message to the blockchain network, where the request message carries a user identifier of the user and a channel identifier, and the request message is used to request one or more of the roaming account balance, the roaming charging rule, and the roaming service statistics abstract that are for the user from a channel indicated by the channel identifier.

In a possible design, before the sending, by the home charging device, a request message to the blockchain network, the method further includes: determining, by the home charging device, an initial roaming account balance for the user based on a home account balance for the user, where the initial roaming account balance for the user is less than or equal to the home account balance for the user; and sending, by the home charging device, the initial roaming account balance for the user and the channel identifier corresponding to the user to the blockchain network, where a plurality of peer nodes on the channel indicated by the channel identifier store one or more of the initial roaming account balance, the roaming charging rule, and the roaming service statistics abstract in a form of a blockchain.

According to a second aspect, this application provides a roaming charging method, including: receiving, by a visited charging device, roaming service statistics for a user from a visited service statistics collection device; updating, by the visited charging device, an initial roaming account balance for the user based on the roaming service statistics and a roaming charging rule for the user, to obtain a roaming account balance; and sending, by the visited charging device to a blockchain network, the roaming account balance for the user and a channel identifier corresponding to the user, where a plurality of peer nodes on a channel indicated by the channel identifier store the roaming account balance for the user in a form of a blockchain.

In a possible design, before the sending, by the visited charging device to a blockchain network, the roaming account balance for the user and a channel identifier corresponding to the user, the method further includes: determining, by the visited charging device, that the roaming account balance for the user is not greater than a preset threshold.

In a possible design, the method further includes: when the visited charging device determines that the roaming account balance for the user is greater than the preset threshold, determining, by the visited charging device, a service authorization limit for the user in a next charging period; and sending, by the visited charging device, the service authorization limit to the visited service statistics collection device.

In a possible design, before the receiving, by a visited charging device, roaming service statistics for a user from a visited service statistics collection device, the method further includes: receiving, by the visited charging device, the initial roaming account balance for the user from the blockchain network; and determining, by the visited charging device, the roaming charging rule for the user.

According to a third aspect, this application provides a roaming charging method, including: determining, by a visited service statistics collection device, roaming service statistics for a user; sending, by the visited service statistics collection device, the roaming service statistics for the user to a visited charging device; sending, by the visited service statistics collection device, the roaming service statistics for the user to a service statistics database; performing, by the visited service statistics collection device, a hash operation on the roaming service statistics for the user, to obtain a roaming service statistics abstract; and sending, by the visited service statistics collection device to a blockchain network, the roaming service statistics abstract and a channel identifier corresponding to the user.

In a possible design, a visited service statistics collection device determines roaming service statistics for a user; the visited service statistics collection device sends the roaming service statistics for the user to a visited charging device; the visited service statistics collection device sends the roaming service statistics for the user and a sub-database identifier to a service statistics database, where a sub-database indicated by the sub-database identifier belongs to the service statistics database, and the sub-database is configured to store the roaming service statistics for the user; and the visited service statistics collection device sends the roaming service statistics and a channel identifier corresponding to the user, to a blockchain network.

In a possible design, before the determining, by a visited statistics collection device, roaming service statistics for a user in a process in which the user uses a roaming service, the method further includes: receiving, by the visited charging device, an authorization limit from the visited charging device; and controlling, based on the authorization limit, the user to use the roaming service.

In a possible design, the sending, by the visited service statistics collection device, the roaming service statistics for the user to a visited charging device further includes: sending, by the visited service statistics collection device, a sub-database identifier to the service statistics database, where a sub-database indicated by the sub-database identifier belongs to the service statistics database, and the sub-database is configured to store the roaming service statistics for the user.

In a possible design, the sub-database identifier is the channel identifier corresponding to the user.

According to a fourth aspect, this application provides a roaming charging method, including: receiving, by a blockchain network, a roaming service statistics abstract for a user and a channel identifier from a visited service statistics collection device; writing, by the blockchain network in a form of a blockchain, the roaming service statistics abstract for the user to a plurality of peer nodes on a channel indicated by the channel identifier; receiving, by the blockchain network from a visited charging device, a roaming account balance for the user, a roaming charging rule, and the channel identifier that are for the user; writing, by the blockchain network in a form of a blockchain, one or both of the roaming account balance and the roaming charging rule to the plurality of peer nodes on the channel indicated by the channel identifier; and sending, by the blockchain network, one or more of the roaming account balance, the roaming charging rule, and the roaming service statistics abstract to a home charging device.

In a possible design, a blockchain network receives roaming service statistics for a user and a channel identifier from a visited service statistics collection device; the blockchain network performs a hash operation on the roaming service statistics to obtain a roaming service statistics abstract; the blockchain network writes, in a form of a blockchain, the roaming service statistics abstract for the user to a plurality of peer nodes on a channel indicated by the channel identifier; the blockchain network receives, from a visited charging device, a roaming account balance, a roaming charging rule, and the channel identifier that are for the user; the blockchain network writes, in a form of a blockchain, one or both of the roaming account balance and the roaming charging rule to the plurality of peer nodes on the channel indicated by the channel identifier; and the blockchain network sends the roaming account balance, the roaming charging rule, and the roaming service statistics abstract to a home charging device.

In a possible design, before the receiving, by a blockchain network, a roaming service statistics abstract and a channel identifier that are for the user from a visited service statistics collection device, the method further includes: receiving, by the blockchain network from the home charging device, an initial roaming account balance and the channel identifier that are for the user; writing, by the blockchain network in a form of a blockchain, the initial roaming account balance for the user to the plurality of peer nodes on the channel indicated by the channel identifier; receiving, by the blockchain network, an initial request message from the visited charging device; and sending, by the blockchain network, the initial roaming account balance to the visited charging device based on the initial request message.

In a possible design, before the sending, by the blockchain network, one or more of the roaming account balance, the roaming charging rule, and the roaming service statistics abstract to a home charging device, the method further includes: receiving, by the blockchain network, a first request message from the home charging device, where the first request message is used to request the blockchain network to send one or more of the roaming account balance, the roaming charging rule, and the roaming service statistics that are for the user.

According to a fifth aspect, this application provides a roaming charging method, including: receiving, by a home charging device from a blockchain network, one or more of a roaming account balance, a roaming charging rule, and roaming service statistics that are for a user; and verifying, by the home charging device, correctness of the roaming account balance based on the roaming charging rule and the roaming service statistics.

In this embodiment of the present invention, the blockchain stores one or more of the roaming account balance, the roaming charging rule, and the roaming service statistics in a form of a blockchain, so that a possibility that the foregoing information is tampered with can be reduced or tampering of the foregoing information is traceable. When verifying the roaming account based on the roaming charging rule and the roaming service statistics, the home charging device can ensure accuracy of a verification result, so that a home carrier can accurately obtain a roaming fee for the user during roaming.

In a possible design, before the receiving, by a home charging device, one or more of a roaming account balance, a roaming charging rule, and roaming service statistics that are for a user from a blockchain network, the method further includes: sending, by the home charging device, a request message to the blockchain network, where the request message carries a user identifier of the user and a channel identifier, and the request message is used to request the roaming account balance, the roaming charging rule, and the roaming service statistics that are for the user from a channel that corresponds to the channel identifier and that is in the blockchain network.

In a possible design, before the sending, by the home charging device, a request message to the blockchain network, the method further includes: determining, by the home charging device, an initial roaming account balance based on a home account balance for the user, where the initial roaming account balance is less than or equal to the home account balance; and sending, by the home charging device to the blockchain network, the initial roaming account balance and the channel identifier corresponding to the user.

According to a sixth aspect, this application provides a roaming charging method, including: determining, by a visited service statistics collection device, roaming service statistics for a user when the user uses a roaming service in a visited carrier; sending, by the visited service statistics collection device, the roaming service statistics for the user to a visited charging device; and sending, by the visited service statistics collection device to a blockchain network, the roaming service statistics and a channel identifier corresponding to the user.

In a possible design, before the determining, by a visited service statistics collection device, roaming service statistics for a user when the user uses a roaming service in a visited carrier, the method further includes: receiving, by the visited service statistics collection device, an authorization limit from the visited charging device, and controlling, based on the authorization limit, the user to use the roaming service.

According to a seventh aspect, this application provides a roaming charging method, including: receiving, by a blockchain network, roaming service statistics for a user and a channel identifier from a visited service statistics collection device; writing, by the blockchain network in a form of a blockchain, the roaming service statistics to a plurality of peer nodes on a channel indicated by the channel identifier, where the plurality of peer nodes belong to the channel indicated by the channel identifier; receiving, by the blockchain network from a visited charging device, one or more of the channel identifier, a roaming account balance, and a roaming charging rule that correspond to the user; writing, by the blockchain network in a form of a blockchain, one or both of the roaming account balance and the roaming charging rule to the plurality of peer nodes on the channel indicated by the channel identifier; and sending, by the blockchain network, one or more of the roaming account balance, the roaming charging rule, and the roaming service statistics to a home charging device.

In a possible design, the receiving, by a blockchain network, roaming service statistics for a user and a channel identifier from a visited service statistics collection device further includes: receiving, by the blockchain network, an initial roaming account balance for the user and the channel identifier from the home charging device; writing, by the blockchain network in a form of a blockchain, the initial roaming account balance for the user to the plurality of peer nodes on the channel indicated by the channel identifier; receiving, by the blockchain network, an initial request message from the visited charging device; and sending, by the blockchain network, the initial roaming account balance to the visited charging device based on the request message.

In a possible design, before the sending, by the blockchain network, the roaming account balance, the roaming charging rule, and the roaming service statistics to a home charging device, the method further includes: receiving, by the blockchain network, a request message from the home charging device, where the request information is used to request the blockchain network to send one or more of the roaming account balance, the roaming charging rule, and the roaming service statistics.

Another aspect of this application provides an apparatus. The apparatus has functions of implementing the roaming charging method according to the first aspect to the seventh aspect and the possible implementations thereof. The functions may be implemented by hardware, or may be implemented by hardware executing corresponding software. The hardware or the software includes one or more modules corresponding to the functions according to the first aspect to the seventh aspect and the possible implementations thereof.

In another possible implementation, the apparatus includes a transceiver, a memory, and a processor. The memory stores a set of program code, and the processor is configured to invoke the program code stored in the memory, to perform the roaming charging method according to the first aspect to the seventh aspect and the possible implementations thereof.

Another aspect of this application provides a computer-readable storage medium. The computer-readable storage medium stores an instruction, and when the instruction is run on a computer, the computer is enabled to perform the methods according to the foregoing aspects.

Another aspect of this application provides a computer program product including an instruction. When the computer program product is run on a computer, the computer is enabled to perform the methods according to the foregoing aspects.

In the implementations provided in all the foregoing aspects, a charging device in a visited area may be an online charging system in the visited area, and a service statistics collection device in the visited area may be a gateway device in the visited area.

BRIEF DESCRIPTION OF THE DRAWINGS

To describe the technical solutions in the embodiments of the present invention or in the background more clearly, the following briefly describes the accompanying drawings required for describing the embodiments of the present invention or the background.

DETAILED DESCRIPTION OF ILLUSTRATIVE EMBODIMENTS

The following describes the embodiments of the present invention in detail with reference to the accompanying drawings of this specification.

Figure 1A:
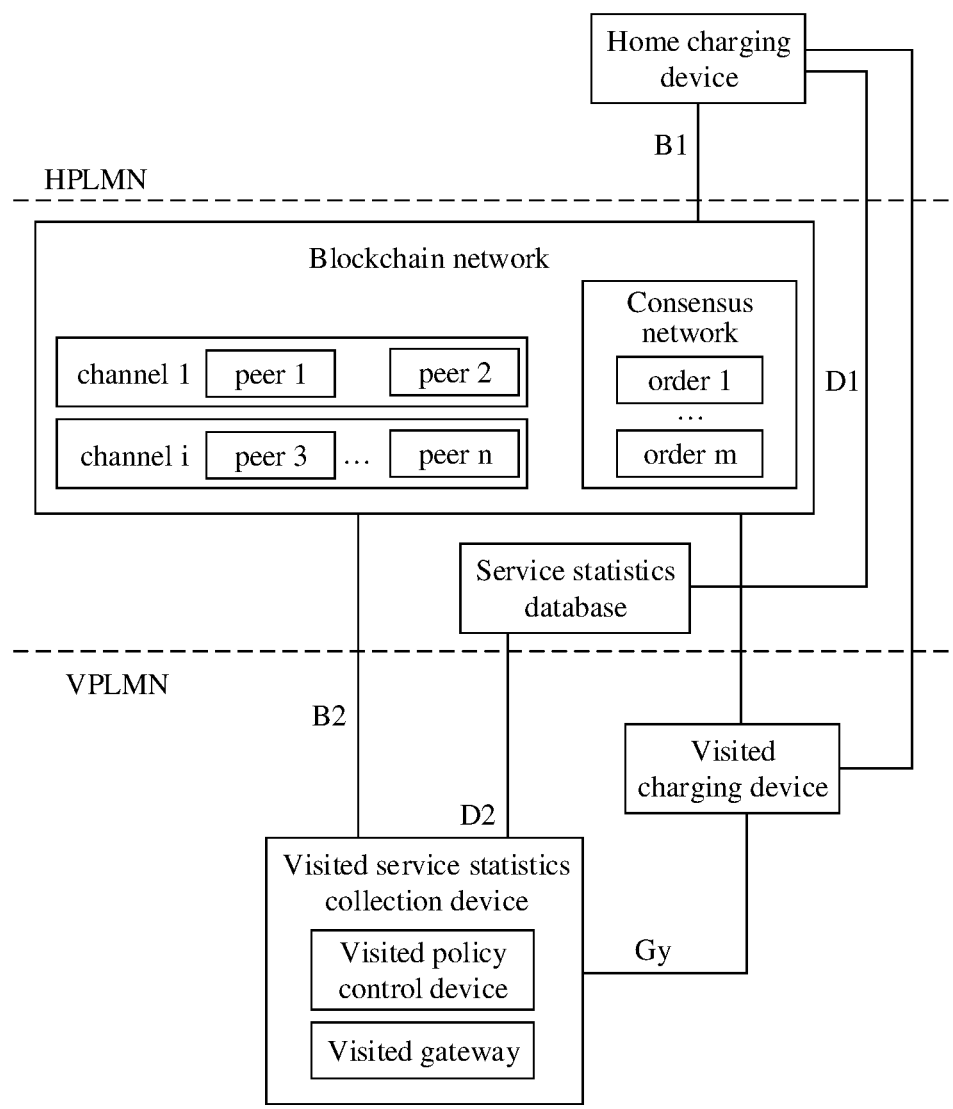
FIG. 1a is a schematic structural diagram of a roaming charging system according to an embodiment of the present invention.

FIG. 1a is a schematic structural diagram of a roaming charging system according to this application. The roaming charging system includes a home charging device, a blockchain network, a visited charging device, a visited service statistics collection device, and a service statistics database.

The home charging device is deployed in a home public land mobile network (HPLMN). The visited service statistics collection device and the visited charging device belong to a visited public land mobile network (VPLMN). A user in the HPLMN roams to the VPLMN. The blockchain network and the service statistics database may be deployed between the VPLMN and the HPLMN. Both the visited charging device and the home charging device may communicate with the blockchain network by using a B1 interface. The visited service statistics collection device may communicate with the blockchain network by using a B2 interface.

The home charging device is mainly configured to store account information, for example, a balance and a bill, of a user in a home area. The home charging device may be an online charging system OCS or an offline charging system.

The blockchain network includes a plurality of blockchain nodes (servers). Each blockchain node in the blockchain network maintains one local ledger, and the local ledger stores a plurality of blocks forming a blockchain. Data is recorded in a block, and newly written data forms a new block that is added to an end of a current blockchain. Each block stores data and also stores a hash value corresponding to data recorded in a previous block. If a block in the blockchain is modified separately, a following block cannot be linked to the block. Therefore, a modification to any block in the blockchain is traceable.

Blockchain networks are categorized into three different application scenarios based on different degrees of centralization of the blockchain networks.

(1) A blockchain network that is open to all users and does not have a user authorization mechanism is referred to as a public blockchain network.

(2) A network in which an authorized node is allowed to join the network and view information based on permission, and which is often used between organizations as a consortium blockchain is referred to as a consortium chain network or an industry chain network.

(3) A network in which all nodes belong to a same organization is referred to as a private blockchain network.

The blockchain network is configured to store one or more of a roaming account balance, roaming service statistics, a roaming service statistics abstract, and a roaming charging rule that are for a user. Information stored in the blockchain network cannot be tampered with, or tampering with information stored in the blockchain network is traceable. The blockchain network may include nodes operated by a third party, or may include nodes of carriers. Types of nodes in the blockchain network include a plurality of order nodes and a plurality of peer nodes. The plurality of order nodes form a consensus network. The consensus network uses a consensus algorithm to reach a consensus on information. A function of the consensus algorithm is to enable at least a half of the plurality of order nodes to store same information. The plurality of peer nodes form a blockchain recording network, configured to generate a blockchain. Optionally, the blockchain network supports a channel feature. The channel feature indicates that the peer nodes in the blockchain network are assigned to different channels, and the peer nodes on the different channels are isolated. In other words, a blockchain generated by a channel is visible only to a peer node on the channel. Optionally, one peer node may belong to a plurality of channels. In extreme cases, all peer nodes belong to a same channel.

The service statistics database is mainly configured to store the roaming service statistics of the user. The roaming service statistics may include one or more records. The roaming service statistics abstract generated based on the roaming service statistics by using, for example, a digital signature algorithm, is stored in the blockchain network.

The visited charging device is mainly configured to perform charging and settlement on the roaming service statistics of the user based on the roaming charging rule. The visited charging device may be a visited OCS.

The visited service statistics collection device is mainly configured to: collect roaming service statistics of the user in a visited carrier, send the roaming service statistics to the visited charging device and the service statistics database, generate an abstract based on the roaming service statistics by using a hash algorithm, and send the abstract to the blockchain network for storage, or directly send the roaming service statistics to the blockchain network for storage. As shown in FIG. 1a, the visited service statistics collection device includes a visited gateway, and the visited gateway may be specifically a visited PCEF. In addition, the visited service statistics collection device may further include a visited policy control device, and the visited policy control device may be a visited PCRF.

Figure 1B:
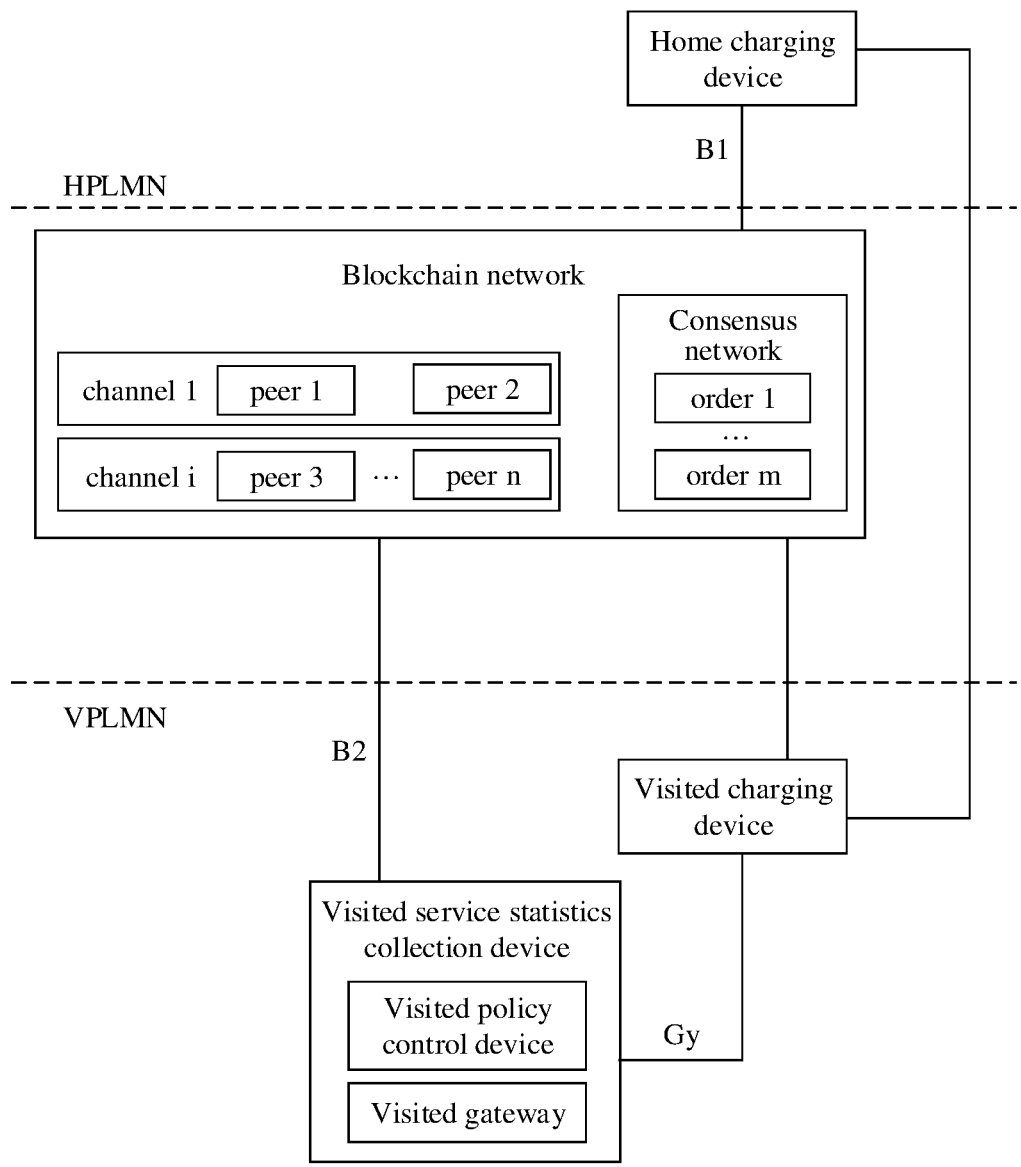
FIG. 1b is another schematic structural diagram of a roaming charging system according to an embodiment of the present invention.

FIG. 1b is another schematic structural diagram of a roaming charging system according to an embodiment of the present invention. A main difference between the roaming charging system in FIG. 1b and the roaming charging system in FIG. 1a lies in that no service statistics database is deployed in the roaming charging system in FIG. 1b, and roaming service statistics, instead of a roaming service statistics abstract, of a user, is directly stored in a blockchain network. For functions of other network elements in FIG. 1b, refer to the descriptions in FIG. 1a. Details are not described herein again.

Herein, in the present invention, the blockchain network is used to store information related to roaming fee settlement, to reduce a possibility that the information related to roaming fee settlement is tampered with. In addition, a digital signature algorithm is used to sign roaming service statistics to generate an abstract, to further prevent the roaming service statistics from being tampered with. In this way, when a home carrier verifies a roaming account balance by using the roaming service statistics and a roaming charging rule, accuracy of a verification result can be ensured, and the home carrier can obtain an accurate roaming fee of a user.

Figure 2:
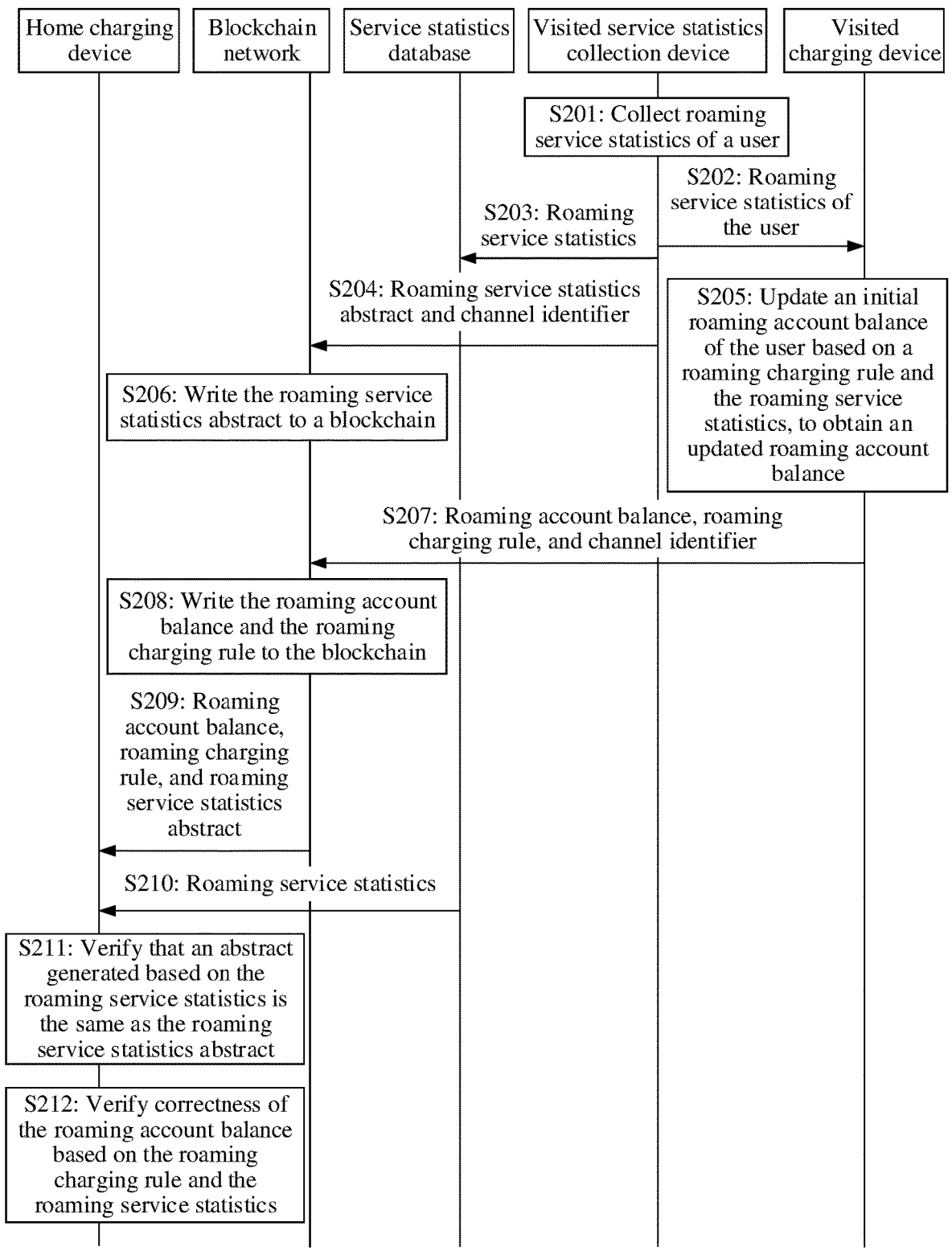
FIG. 2 is a schematic flowchart of a roaming charging method according to an embodiment of the present invention.

FIG. 2 is a schematic flowchart of a roaming charging method according to an embodiment of the present invention. The roaming charging method is applicable to the network architecture in FIG. 1a. The method includes the following steps.

S201: The visited service statistics collection device determines roaming service statistics of a user.

Specifically, the visited service statistics collection device is deployed in the VPLMN, the user uses user equipment to use a service in the VPLMN, and the visited service statistics collection device determines the roaming service statistics of the user. The roaming service statistics indicates statistics, such as call duration and traffic, of the service used by the user in the VPLMN. The roaming service statistics may include one or more statistics. For example, an HPLMN of a user A is a PLMN 1, the user A roams to a PLMN 2, roaming service statistics of the user A in the PLMN 2 that are collected by a service statistics collection device in the PLMN 2 are as follows: Data traffic used from 11:11:00 on Nov. 11, 2017 to 11:11:10 on Nov. 11, 2017 is 10 MB, and call duration from 11:30:00 on Nov. 11, 2017 to 12:00:00 on Nov. 11, 2017 is 30 minutes.

Optionally, before the visited service statistics collection device collects the roaming service statistics of the user, the home charging device sends an initial roaming account balance and a channel identifier corresponding to the user to the blockchain network. The home charging device may further send a user identifier of the user or a roaming account corresponding to the user to the blockchain network. The blockchain network distinguishes between information about different users based on user identifiers. The user identifier includes but is not limited to any one of an international mobile subscriber identity (IMSI) or a globally unique temporary UE identity.

Different carriers have different channel identifiers. One channel identifier is allocated to each carrier. The channel identifier may be stored in a network element of a home carrier. For example, the channel identifier is stored in the home charging device or a home policy control device, and the home charging device obtains the channel identifier from the network element. For another example, the home charging device stores a channel identifier corresponding to a carrier to which the home charging device belongs. The blockchain network receives the initial roaming account balance and the channel identifier corresponding to the user from the home charging device. The visited charging device requests the initial roaming account balance of the user from the blockchain network. A request sent by the visited charging device to the blockchain network may further carry the user identifier of the user. The blockchain network distinguishes between information of different users based on user identifiers.

Specifically, the initial roaming account balance is determined based on an actual balance in an account of the user in the HPLMN. For example, the initial roaming account balance is less than or equal to the actual balance, or the initial roaming account balance is 80% of the actual balance, to be specific, the actual balance is 100 CNY, and the initial roaming account balance is 80 CNY.

For example, the home charging device sends a first account balance of the user A and the channel identifier to the blockchain network by using the B1 interface. If the first account balance is 80 CNY, and the channel identifier is channel-1, the home charging device may send a message {data: userA, accountbalance: 80, channel: channel-1} to the blockchain network by using the B1 interface. The channel identifier is determined by the HPLMN of the user.

In the consensus network of the blockchain network, consensus is reached on the initial roaming account balance based on a consensus algorithm. The consensus algorithm includes but is not limited to any one of proof of work (POW), proof of stake (PoS), delegated proof of stake (DPoS), or a practical Byzantine fault tolerance (PBFT) algorithm. Then, a channel that is indicated by the channel identifier and that is in the blockchain network is determined, and all peer nodes on the channel write the first account balance to a blockchain.

Optionally, the visited charging device requests the initial roaming account balance from a channel node that is indicated by the channel identifier corresponding to the user and that is in the blockchain network. The request may further carry the user identifier of the user, to obtain the initial roaming account balance corresponding to the user identifier. The blockchain network distinguishes between information of different users based on user identifiers. For example, the visited charging device may request, by using the B1 interface, an initial roaming account balance of the user A from a plurality of peer nodes on the channel that is indicated by channel-1 and that is in the blockchain network, and perform consistency verification on a plurality of returned results (to prevent some nodes from performing malicious operations).

Optionally, the visited charging device establishes a roaming account of the user in the VPLMN based on the initial roaming account balance, and then the visited charging device may instruct the user to select a visited package (optional); and determine a roaming charging rule based on the selected visited package. Alternatively, the roaming charging rule is pre-configured and does not need to be selected by the user. For example, the visited charging device establishes a roaming account of the user A in the VPLMN, and sets an available roaming account balance to 80 CNY. A visited package selected by the user A in the VPLMN is 50 CNY for 1 GB traffic, and 10 CNY per 100 MB traffic for extra traffic. A determined charging rule is that accumulated traffic within 1 GB is free of charge, and traffic beyond 1 GB is charged 0.1 CNY/MB. After the user selects the visited package, the roaming account of the user is charged and settled, and the roaming account balance is updated. In this example, an updated roaming account balance is 30 CNY. Optionally, the visited charging device sends the updated roaming account balance, the roaming charging rule, and the channel identifier corresponding to the user to the blockchain network. After receiving the roaming account balance and the roaming charging rule, the blockchain network writes the roaming account balance and the roaming charging rule to a blockchain of the user A that is generated by a channel node indicated by the channel identifier.

S202: The visited service statistics collection device sends the roaming service statistics of the user to the visited charging device, and the visited charging device receives the roaming service statistics of the user from the visited service statistics collection device.

Specifically, the visited charging device is deployed in the VPLMN, and the visited service statistics collection device and the visited charging device may communicate with each other by using a Gy interface. For example, the visited service statistics collection device sends the roaming service statistics to the visited charging device by using the Gy interface. For example, a format of the sent roaming service statistics is {user: A, start-date: DATE(2017-11-11), start-time: TIME(11:11:00), end-date: DATE(2017-11-11), end-time: TIME(11:11:10), data-usage: 10 MB}.

S203: The visited service statistics collection device sends the roaming service statistics to the service statistics database, and the service statistics database receives the roaming service statistics from the visited statistics collection device.

Specifically, the service statistics database may be deployed in the VPLMN, or deployed in the HPLMN, or may be deployed outside the VPLMN and the HPLMN. The visited service statistics collection device and the service statistics database may communicate with each other by using a D2 interface.

Optionally, the visited service statistics collection device further sends a sub-database identifier to the service statistics database, the sub-database identifier is used to indicate an identity of a sub-database, and the sub-database identifier is the channel identifier corresponding to the user. The service statistics database includes a plurality of sub-databases, each sub-database has a different sub-database identifier, and different sub-databases are associated with different public land mobile networks (PLMN). For example, the service statistics database includes a sub-database 1, a sub-database 2, and a sub-database 3. The sub-database 1 is associated with the PLMN 1, the sub-database 2 is associated with a PLMN 3, the sub-database 3 is associated with a PLMN 4, the HPLMN of the user A is the PLMN 1, and the sub-database identifier may be the channel identifier corresponding to the PLMN 1 in which the user A is located. The service statistics database may be deployed in a distributed manner. For example, a MongoDB cluster is used to construct the service statistics database.

Optionally, the sub-database identifier of the user is the channel identifier corresponding to the user. The peer nodes in the blockchain network are assigned to a plurality of channels based on different PLMNs, and different channels correspond to the different PLMNs. Different carriers have different channel identifiers. One channel identifier is allocated to each carrier. The channel identifier may be stored in a network element of a home carrier, for example, stored in the home charging device or the home policy control device. The visited service statistics collection device obtains the channel identifier from the network element.

A format of the roaming service statistics and the sub-database identifier that are sent by the visited service statistics collection device may be {data: {user: A, start-date: DATE(2017-11-11), start-time: TIME(11:11:00), end-date: DATE(2017-11-11), end-time: TIME(11:11:10), data-usage: 10 MB}, database: channel-1}. In the message, "A" is the user identifier.

The service statistics database determines the corresponding sub-database based on the sub-database identifier, and adds the roaming service statistics to the sub-database. For example, a command used to store the roaming service statistics by the service statistics database that is constructed by using the MongoDB cluster is as follows:
>usechannel-1
>db.default-collection.insert({user: A, start-date: DATE(2017-11-11), start-time: TIME(11:11:00), end-date: DATE(2017-11-11), end-time: TIME(11:11:10), data-usage: 10 MB}, where channel-1 indicates a sub-database identifier, and herein channel-1 is the channel identifier corresponding to the user; and A is the user identifier of the user.

In this example, a sub-database indicated by channel-1 in the MongoDB cluster uses default default-collection to store the roaming service statistics. Optionally, the visited service statistics collection device may alternatively send set information (for example, data of each month corresponds to one set) to the service statistics database. For example, a sent message may be represented as {data: {user: A, start-date: DATE(2017-11-11), start-time: TIME(11:11:00), end-date: DATE(2017-11-11), end-time: TIME(11:11:10), data-usage: 10 MB}, database: channel-1, collection: November}. In this case, a command used to store the roaming service statistics by the service statistics database that is constructed by using the MongoDB cluster is as follows:
>usechannel-1
>db.November.insert({user: A, start-date: DATE(2017-11-11), start-time: TIME(11:11:00), end-date: DATE(2017-11-11), end-time: TIME(11:11:10), data-usage: 10 MB}, where channel-1 indicates a sub-database identifier, and herein channel-1 is the channel identifier corresponding to the user; and A is the user identifier of the user.

S204: The visited service statistics collection device sends a roaming service statistics abstract and the channel identifier to the blockchain network, and the blockchain network receives the roaming service statistics abstract and the channel identifier from the visited service statistics collection device.

Specifically, the visited service statistics collection device performs a hash operation on the roaming service statistics by using a digital signature algorithm to generate the roaming service statistics abstract. A type of the digital signature algorithm is not limited in this embodiment. For example, the digital signature algorithm is SHA256. The visited service statistics collection device and the blockchain network may communicate with each other by using a B2 interface. For example, the roaming service statistics abstract and the channel identifier that are sent by the visited service statistics collection device to the blockchain network may be represented as {usage-abstract: abstract-exam, channel: channel-1}. The visited service statistics collection device may further send the user identifier of the user to the blockchain network, and the blockchain network distinguishes between information about different users based on user identifiers.

S205: The visited charging device updates the initial roaming account balance of the user based on the roaming charging rule and the roaming service statistics, to obtain an updated roaming account balance.

Specifically, the initial roaming account balance is an initial balance in the HPLMN before the user roams to the VPLMN, and the initial balance is related to an actual balance of the user in the HPLMN. For example, the initial roaming account balance is less than or equal to the actual balance. In this way, a security threshold can be provided for the roaming account balance, to prevent the user from generating a large bill and being in arrears when using a roaming service. It should be noted that the balance in this embodiment indicates a measure of an available network service volume, and the balance may be represented by an amount of money, a bonus point, a credit value, or in another manner, which is not limited in this embodiment. The roaming charging rule indicates a charging rule for the user in the VPLMN. The visited charging device updates the initial roaming account balance based on the roaming service statistics and the roaming charging rule that are for the user. For example, if the initial roaming account balance of the user is 30 CNY, and the visited charging device determines, based on the roaming charging rule and the roaming service statistics, that a current roaming fee is 1 CNY, the roaming account balance obtained by the visited charging device after the update is 29 CNY.

Optionally, the visited charging device may further determine, based on the roaming account balance, whether a service authorization limit in a next charging period is satisfied; and if yes, send the service authorization limit in the next charging period to the visited service statistics collection device. For example, the service authorization limit is 10 MB, and the visited charging device and the visited service statistics collection device communicate with each other by using the Gy interface. When the visited charging device determines that the user satisfies the service authorization limit in the next charging period, a format of a sent message may be represented as {user: A, pre-authorization: 10 MB}, where A indicates the user identifier of the user, and 10 MB indicates the service authorization limit.

S206: The blockchain network writes the roaming service statistics abstract to a blockchain.

Specifically, the consensus network of the blockchain network first uses the consensus algorithm to reach a consensus on the roaming service statistics abstract of the user, and then determines the channel indicated by the channel identifier. All the peer nodes on the channel write the roaming service statistics abstract to the blockchain.

It should be noted that an execution sequence of S202, S203, and S204 is not limited to the sequence in FIG. 2, and may be performed in any sequence. This is not limited in this embodiment.

S207: The visited charging device sends the roaming account balance, the roaming charging rule, and the channel identifier to the blockchain network, and the blockchain network receives the roaming account balance, the roaming charging rule, and the channel identifier from the visited charging device.

Specifically, the visited charging device and the blockchain network may communicate with each other by using the B1 interface. The visited charging device may send the foregoing information when the user ends the current roaming service, or may send the foregoing information when the user uses the roaming service, or may send the foregoing information when the user leaves the VPLMN. This is not limited in this embodiment. For example, a format of the sent information may be {user: A, account-balance: 30, billing-rules: rules-exam, channel: channel-1}.

S208: The blockchain network writes the roaming account balance and the roaming charging rule to the blockchain.

Specifically, the consensus network in the blockchain network uses the consensus algorithm to reach a consensus on the roaming account balance and the roaming charging rule, and then determines the channel indicated by the channel identifier. All the peer nodes on the channel write the roaming account balance and the roaming charging rule to the blockchain. This step may be performed when the user ends the roaming service, or may be performed when the user uses the roaming service.

S209: The blockchain network sends the roaming account balance, the roaming charging rule, and the roaming service statistics abstract to the home charging device, and the home charging device receives the roaming account balance, the roaming charging rule, and the roaming service statistics abstract from the blockchain network.

Specifically, the home charging device may request transaction information from the plurality of peer nodes corresponding to the channel identifier corresponding to the user in the blockchain network. The request may further include the user identifier of the user. The blockchain network distinguishes between information of different users based on user identifiers. The transaction information includes the roaming account balance, the roaming charging rule, and the roaming service statistics abstract. For example, if the user A starts to use a roaming data service at 11:11 on Nov. 11, 2017 and ends the roaming data service at 11:21 on Nov. 11, 2017, the home charging device requests, by using the B1 interface from the plurality of peer nodes on channel-1 in the blockchain network, a roaming account balance, a roaming charging rule, and a roaming service statistics abstract that are for the user A when the user A uses the roaming service in a visited location, and a format of a sent request message may be {user: A, data-list: [account-balance, billing-rules-list, usage-abstract], start-date: DATE(2017-11-11), start-time: TIME(11:11:00), end-date: DATE(2017-11-11), end-time: TIME(11:21:00)}. After receiving the transaction information of the user A that is returned by the plurality of peer nodes, the home charging device performs consistency verification on the obtained transaction information (to prevent some peer nodes from performing malicious operations, for example, some peer nodes modify, without approval, the transaction information without reaching a consensus).

S210: The service statistics database sends the roaming service statistics to the home charging device, and the home charging device receives the roaming service statistics from the service statistics database.

For example, the home charging device requests, by using a D1 interface, the roaming service statistics from a sub-database corresponding to the user in the service statistics database, and a format of a request message may be {user: A, database: channel-1, start-date: DATE(2017-11-11), start-time: TIME(11:11:00), end-date: DATE(2017-11-11), end-time: TIME(11:21:00)}. When the sub-database corresponding to the user in the service statistics database creates collection (collection) by month, a format of a message sent by the home charging device may be {user: A, database: channel-1, collection: November, start-date: DATE(2017-11-11), start-time: TIME(11:11:00), end-date: DATE(2017-11-11), end-time: TIME(11:21:00)}.

S211: The home charging device verifies that an abstract generated based on the roaming service statistics is the same as the roaming service statistics abstract.

Specifically, the home charging device performs, by using a digital signature algorithm the same as that in S204, a hash operation on the roaming service statistics that is from the service statistics database, to generate the abstract, and performs consistency verification on the abstract and the roaming service statistics abstract from the blockchain network. After the verification succeeds, S212 is performed.

If the verification fails, the home charging device sends, to the visited charging device and the visited service statistics collection device, indication information indicating that the verification fails. After the visited charging device and the visited service statistics collection device receive the indication information, the visited charging device and the visited service statistics collection device re-provide new information used for roaming charging and settlement based on steps S201 to S210. The home charging device re-performs verification based on updated information used for roaming charging and settlement.

S212: The home charging device verifies correctness of the roaming account balance based on the roaming charging rule and the roaming service statistics.

Specifically, the home charging device may input the roaming charging rule and the roaming service statistics into a charging engine to obtain a roaming fee; obtain a balance based on the roaming fee and a home account balance; and compare whether the obtained balance is equal to the roaming account balance that is stored in the blockchain network. If the obtained balance is equal to the roaming account balance that is stored in the blockchain network, it indicates that the roaming account balance in the blockchain is accurate. If the roaming charging rule is incompatible with the charging engine of the home charging device (for example, a payment manner and a currency type in the roaming charging rule are different from those in the charging engine of the home charging device), the roaming charging rule may be first converted into a mode compatible with the charging engine of the home charging device, and then the roaming account balance is verified.

According to the descriptions in FIG. 2, the blockchain network stores information related to fee settlement, to reduce a possibility that the information related to roaming fee settlement is tampered with. In addition, the digital signature algorithm is used to sign the roaming service statistics to generate the abstract, to further prevent the roaming service statistics from being tampered with. In this way, when the home carrier verifies the roaming account balance by using the roaming service statistics and the roaming charging rule, accuracy of a verification result can be ensured, and the home carrier can obtain an accurate roaming fee of the user.

Figure 3:
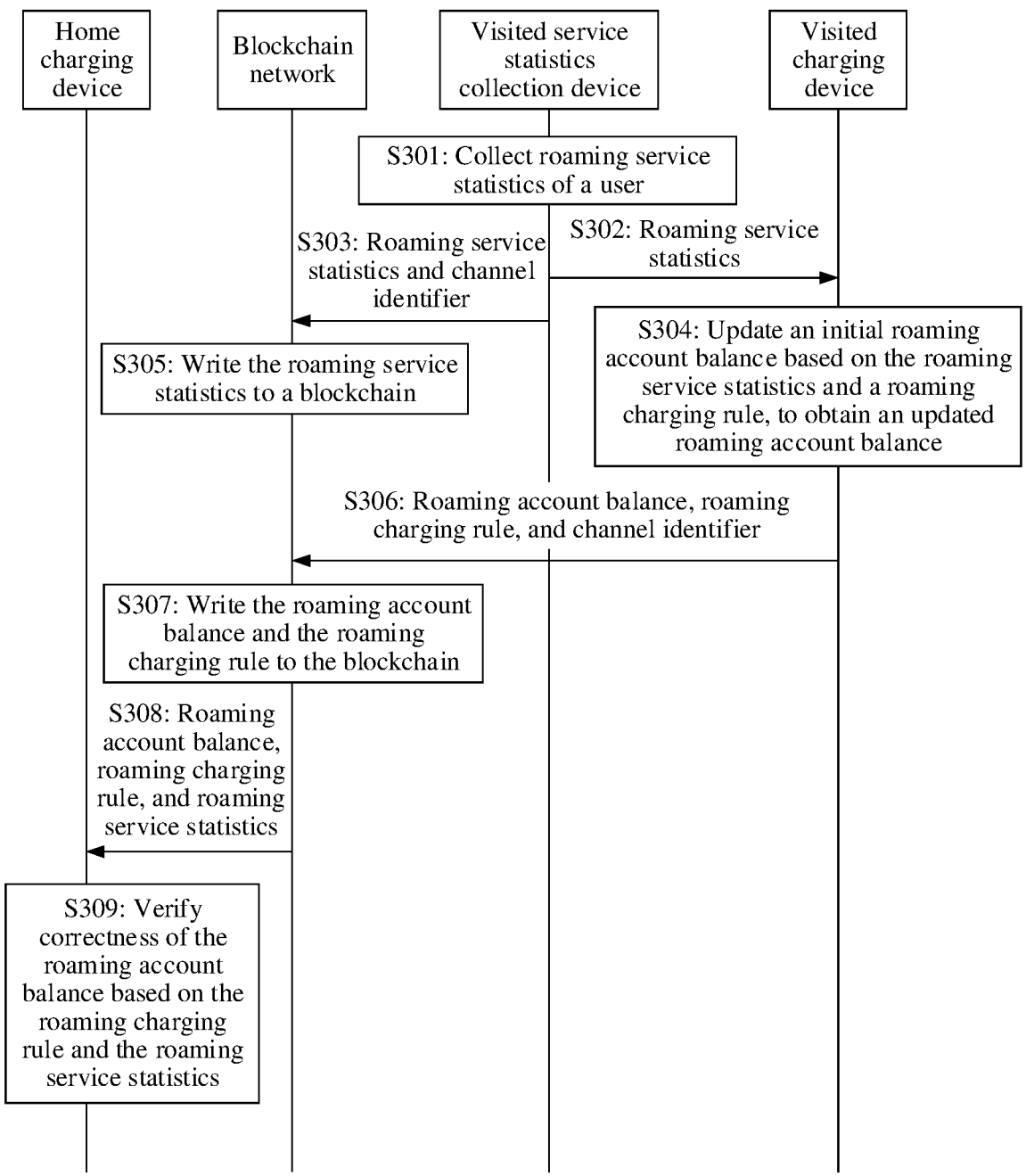
FIG. 3 is another schematic flowchart of a roaming charging method according to an embodiment of the present invention.
Figure 4:
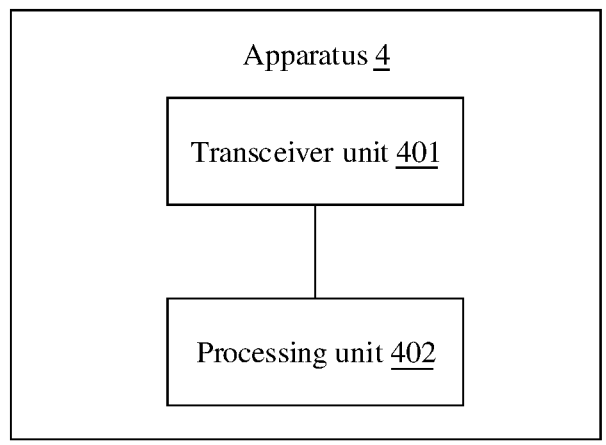
FIG. 4 is a schematic structural diagram of an apparatus according to an embodiment of the present invention.

FIG. 3 is another schematic flowchart of a roaming charging method according to an embodiment of the present invention. This embodiment of the present invention is applicable to the network architecture in FIG. 1*b*. The method includes the following steps.

S301: The visited service statistics collection device collects roaming service statistics of a user.

Specifically, for a specific process of S301, refer to the descriptions of S201 in FIG. 2. Details are not described herein again.

S302: The visited service statistics collection device sends the roaming service statistics of the user to the visited charging device, and the visited charging device receives the roaming service statistics of the user from the visited service statistics collection device.

Specifically, for a specific process of S302, refer to the descriptions of S202 in FIG. 2. Details are not described herein again.

S303: The visited service statistics collection device sends the roaming service statistics and a channel identifier to the blockchain network, and the blockchain network receives the roaming service statistics and the channel identifier from the visited service statistics collection device. The visited service statistics collection device may further send a user identifier of the user to the blockchain network, and the blockchain network distinguishes between information of different users based on user identifiers.

Specifically, for a specific process of S303, refer to the descriptions of S203 in FIG. 2. Details are not described herein again.

S304: The visited charging device updates an initial roaming account balance of the user based on a roaming charging rule and the roaming service statistics, to obtain an updated roaming account balance.

Specifically, for a specific process of S304, refer to the descriptions of S204 in FIG. 2. Details are not described herein again.

S305. The blockchain network writes the roaming service statistics to a blockchain.

Specifically, for a specific process of S305, refer to the descriptions of S205 in FIG. 2. Details are not described herein again.

It should be noted that an execution sequence of S302 and S303 is not limited to the sequence in FIG. 3, and S303 may be performed before S302.

S306: The visited charging device sends the roaming account balance, the roaming charging rule, and the channel identifier to the blockchain network, and the blockchain network receives the roaming account balance, the roaming charging rule, and the channel identifier from the visited charging device.

Specifically, for a specific process of S306, refer to the descriptions of S206 in FIG. 2. Details are not described herein again.

S307: The blockchain network writes the roaming account balance and the roaming charging rule to the blockchain.

Specifically, for a specific process of S307, refer to the descriptions of S207 in FIG. 2. Details are not described herein again.

S308: The blockchain network sends the roaming account balance, the roaming charging rule, and the roaming service statistics to the home charging device, and the home charging device receives the roaming account balance, the roaming charging rule, and the roaming service statistics from the blockchain network.

Specifically, the home charging device may request transaction information from a plurality of peer nodes corresponding to the channel identifier corresponding to the user in the blockchain network. The request may further carry the user identifier of the user. The blockchain network distinguishes between information of different users based on the user identifier. The transaction information includes the roaming account balance, the roaming charging rule, and the roaming service statistics. For example, if a user A starts to use a roaming data service at 11:11 on Nov. 11, 2017 and ends the roaming data service at 11:21 on Nov. 11, 2017, the home charging device requests, by using a B1 interface from a plurality of peer nodes of channel-1 in the blockchain network, a roaming account balance, a roaming charging rule, and roaming service statistics that are for the user A in a process in which the user A uses the roaming service in a visited location, and a format of a sent request message may be {user: A, data-list: [account-balance, billing-rules-list, usage], start-date: DATE(2017-11-11), start-time: TIME(11:11:00), end-date: DATE(2017-11-11), end-time: TIME(11:21:00)}. After receiving the transaction information of the user A that is returned by the plurality of peer nodes, the home charging device performs consistency verification on the obtained transaction information (to prevent some peer nodes from performing malicious operations).

S309: The home charging device verifies correctness of the roaming account balance based on the roaming charging rule and the roaming service statistics.

Specifically, the home charging device may input the roaming charging rule and the roaming service statistics into a charging engine of the home charging device, and verify accuracy of the roaming account balance. When the roaming charging rule is incompatible with the charging engine of the home charging device, the roaming charging rule may be first converted into a mode compatible with the charging engine of the home charging device.

According to the descriptions in FIG. 3, the blockchain stores one or more of the roaming account balance, the roaming charging rule, and the roaming service statistics in a form of a blockchain, so that a possibility that the foregoing information is tampered with can be reduced or tampering of the foregoing information is traceable. When verifying the roaming account based on the roaming charging rule and the roaming service statistics, the home charging device can ensure accuracy of a verification result, so that a home carrier can accurately obtain a roaming fee of the user during roaming.

FIG. 2 and FIG. 3 describe in detail the roaming charging method according to the embodiments of the present invention. The following provides a roaming charging apparatus (referred to as an apparatus 4 below) according to an embodiment of the present invention. The apparatus 4 includes a transceiver unit 401 and a processing unit 402. Functions of the transceiver unit 401 and the processing unit 402 may be implemented by software modules, or may be implemented by specific hardware.

In a possible implementation, the apparatus 4 may be a home charging device, and the apparatus 4 is configured to perform S209 to S212 performed in FIG. 2.

The transceiver unit 401 is configured to receive one or more of a roaming account balance, a roaming charging rule, and a roaming service statistics abstract from a blockchain network.

The transceiver unit 401 is further configured to receive roaming service statistics of the user from a service statistics database.

The processing unit 402 is configured to: if an abstract obtained based on the roaming service statistics of the user is the same as the roaming service statistics abstract, verify correctness of the roaming account balance based on the roaming service statistics and the roaming charging rule.

Optionally, the transceiver unit 401 is configured to send a request message to the blockchain network, where the request message carries a user identifier of the user and a channel identifier, and the request message is used to request one or more of the roaming account balance, the roaming charging rule, and the roaming service statistics abstract that are for the user from a channel indicated by the channel identifier.

Optionally, the processing unit 402 is further configured to determine an initial roaming account balance of the user based on a home account balance of the user, where the initial roaming account balance of the user is less than or equal to the home account balance of the user; and the transceiver unit 401 is further configured to send the initial roaming account balance of the user and the channel identifier corresponding to the user to the blockchain network, where a plurality of peer nodes on the channel indicated by the channel identifier store one or more of the initial roaming account balance, the roaming charging rule, and the roaming service statistics abstract in a form of a blockchain.

In another possible implementation, the apparatus 4 may be a visited charging device, and the apparatus 4 is configured to perform S202, S205, and S207 in FIG. 2.

The transceiver unit 401 is configured to receive roaming service statistics of a user from a visited service statistics collection device.

The processing unit 402 is configured to update an initial roaming account balance of the user based on the roaming service statistics and a roaming charging rule for the user, to obtain a roaming account balance.

The transceiver unit 401 is further configured to send the roaming account balance of the user and a channel identifier corresponding to the user, to a blockchain network, where a plurality of peer nodes on a channel indicated by the channel identifier store the roaming account balance of the user in a form of a blockchain.

Optionally, the processing unit 402 is further configured to determine that the roaming account balance of the user is not greater than a preset threshold.

Optionally, the processing unit 402 is further configured to: when determining that the roaming account balance of the user is greater than the preset threshold, determine a service authorization limit of the user in a next charging period; and the transceiver unit 401 is further configured to send the service authorization limit to the visited service statistics collection device.

Optionally, the transceiver unit 401 is further configured to receive the initial roaming account balance of the user from the blockchain network; and the processing unit is further configured to determine the roaming charging rule for the user.

In another possible implementation, the apparatus 4 may be a visited service statistics collection device, and the apparatus 4 is configured to perform S201 to S204 in FIG. 2.

The processing unit 402 is configured to determine roaming service statistics of a user.

The transceiver unit 401 is configured to send the roaming service statistics of the user to a visited charging device.

The transceiver unit 401 is further configured to send the roaming service statistics of the user to a service statistics database, where a sub-database indicated by a sub-database identifier belongs to the service statistics database, and the sub-database is configured to store the roaming service statistics of the user.

The processing unit 402 is further configured to perform a hash operation on the roaming service statistics of the user, to obtain a roaming service statistics abstract.

The transceiver unit 401 is further configured to send the roaming service statistics abstract and a channel identifier corresponding to the user, to a blockchain network, where a plurality of peer nodes on a channel indicated by the channel identifier store the roaming service statistics abstract in a form of a blockchain.

Optionally, the transceiver unit 401 is further configured to send the sub-database identifier to the service statistics database, where the sub-database indicated by the sub-database identifier belongs to the service statistics database, and the sub-database is configured to store the roaming service statistics of the user.

Optionally, the transceiver unit 401 is further configured to receive an authorization limit from the visited charging device; and control, based on the authorization limit, the user to use a roaming service.

Optionally, the sub-database identifier is the channel identifier corresponding to the user.

In another possible implementation, the apparatus 4 may be any node or device in a blockchain network, and the apparatus 4 is configured to perform S204, S206, S207, S208, and S209 in FIG. 2.

The transceiver unit 401 is configured to receive a roaming service statistics abstract of a user and a channel identifier from a visited service statistics collection device.

The processing unit 402 is configured to write, in a form of a blockchain, the roaming service statistics abstract of the user to a plurality of peer nodes on a channel indicated by the channel identifier.

The transceiver unit 401 is further configured to receive one or more of a roaming account balance, a roaming charging rule, and the channel identifier that are for the user from a visited charging device.

The processing unit 402 is further configured to write, in a form of a blockchain, one or both of the roaming account balance and the roaming charging rule to the peer nodes.

The transceiver unit 401 is further configured to send one or more of the roaming account balance, the roaming charging rule, and the roaming service statistics abstract to a home charging device.

Optionally, the transceiver unit 401 is further configured to receive an initial roaming account balance of the user and the channel identifier from the home charging device; the processing unit 402 is further configured to write, in a form of a blockchain, the initial roaming account balance of the user to the plurality of peer nodes on the channel indicated by the channel identifier; the transceiver unit 401 is further configured to receive an initial request message from the visited charging device, where the request message carries the channel identifier; and the transceiver unit 402 is further configured to send the initial roaming account balance to the visited charging device based on the request message.

Optionally, the transceiver unit 401 is further configured to receive a first request message from the home charging device, where the first request message is used to request the blockchain to send one or more of the roaming account balance, the charging rule information, and the roaming service statistics that are for the user.

In another possible implementation, the apparatus 4 may be the home charging device in FIG. 3, and the apparatus 4 is configured to perform S308 and S309 in FIG. 3.

The transceiver unit 401 is configured to receive one or more of a roaming account balance, a roaming charging rule, and roaming service statistics that are for a user from a blockchain network.

The processing unit 402 is configured to verify correctness of the roaming account balance based on the roaming charging rule and the roaming service statistics.

Optionally, the transceiver unit 401 is further configured to send a request message to the blockchain network, where the request message carries a user identifier of the user and a channel identifier, and the request message is used to request one or more of the roaming account balance, the roaming charging rule, and the roaming service statistics that are for the user from a channel indicated by the channel identifier.

Optionally, the processing unit 402 is further configured to determine an initial roaming account balance based on a home account balance of the user, where the initial roaming account balance is less than or equal to the home account balance; and the transceiver unit is further configured to send the initial roaming account balance and the channel identifier corresponding to the user to the blockchain network.

In another possible implementation, the apparatus 4 may be a visited service statistics collection device, and the apparatus 4 is configured to perform S301 to S303 in FIG. 3.

The processing unit 402 is configured to determine roaming service statistics of a user.

The transceiver unit 401 is configured to send the roaming service statistics of the user to a visited charging device.

The transceiver unit 401 is further configured to send the roaming service statistics and a channel identifier corresponding to the user, to a blockchain network, where a plurality of peer nodes on a channel indicated by the channel identifier store the roaming service statistics in a form of a blockchain, and the channel is located in the blockchain network.

Optionally, the transceiver unit 401 is further configured to receive an authorization limit from the visited charging device, and control, based on the authorization limit, the user to use a roaming service.

In another possible implementation, the apparatus 4 may be any node or device in a blockchain network, and the apparatus 4 is configured to perform S303, S305, S306, S307, and S308 in FIG. 3.

The transceiver unit 401 is configured to receive roaming service statistics of a user and a channel identifier from a visited service statistics collection device.

The processing unit 402 is configured to write, in a form of a blockchain, the roaming service statistics to a plurality of peer nodes on a channel indicated by the channel identifier, where the plurality of peer nodes belong to the channel indicated by the channel identifier.

The transceiver unit 401 is further configured to receive, from a visited charging device, one or more of the channel identifier, a roaming account balance, and a roaming charging rule that correspond to the user.

The processing unit 402 is further configured to write, in a form of a blockchain, one or both of the roaming account balance and the roaming charging rule to the plurality of peer nodes on the channel indicated by the channel identifier.

The transceiver unit 401 is further configured to send one or more of the roaming account balance, the roaming charging rule, and the roaming service statistics to a home charging device.

Optionally, the transceiver unit 401 is further configured to receive an initial roaming account balance of the user and the channel identifier from the home charging device; the processing unit 402 is further configured to write, in a form of a blockchain, the initial roaming account balance of the user to the plurality of peer nodes on the channel indicated by the channel identifier; the transceiver unit 401 is further configured to receive an initial request message from the visited charging device; and the transceiver unit 401 is further configured to send the initial roaming account balance to the visited charging device based on the request message.

Optionally, the transceiver unit 401 is further configured to receive a request message from the home charging device, where the request information is used to request the blockchain network to send one or more of the roaming account balance, the roaming charging rule, and the roaming service statistics.

The apparatus 4 may alternatively be a field-programmable gate array (FPGA), a dedicated integrated chip, a system on chip (SoC), a central processing unit (CPU), a network processing unit (NP), a digital signal processing circuit, or a micro controller (MCU) that implements a related function; or may be a programmable logic controller (PLD) or another integrated chip.

This embodiment of the present invention and the method embodiments in FIG. 2 to FIG. 3 are based on a same idea and have a same technical effect. For a specific process, refer to the descriptions in the method embodiments in FIG. 2 to FIG. 3. Details are not described herein again.

Figure 5:
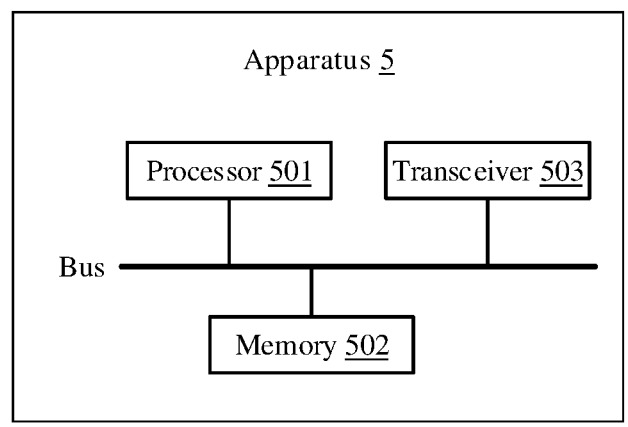
FIG. 5 is another schematic structural diagram of an apparatus according to an embodiment of the present invention.

FIG. 5 is a schematic structural diagram of an apparatus according to an embodiment of the present invention, and the apparatus is hereinafter referred to as an apparatus 5. The apparatus 5 uses a general-purpose computer architecture, and the apparatus 5 may implement functions of the home charging device, the blockchain network, the visited service statistics collection device, or the visited charging device.

As shown in FIG. 5, the apparatus includes a memory 502, a processor 501, and a transceiver 503.

The memory 502 may be an independent physical unit, and may be connected to the processor 501 and the transceiver 503 by using a bus. The memory 502, the processor 501, and the transceiver 503 may alternatively be integrated together, and implemented by hardware, or the like.

The memory 502 is configured to store a program for implementing the foregoing method embodiments or each module in the apparatus embodiment. The processor 501 invokes the program to perform the method corresponding to each device in S201 to S212 in FIG. 2 and the method corresponding to each device in S301 to S309 in FIG. 3.

Optionally, when a part or all of the roaming charging method in the foregoing embodiments is implemented by software, an apparatus 5 may alternatively include only a processor. A memory configured to store a program is located outside the apparatus 5, and the processor is connected to the memory by using a circuit/wire and configured to read and execute the program stored in the memory.

The processor may be a central processing unit (CPU), a network processing unit (network processor, NP), or a combination of a CPU and an NP.

The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory may include a volatile memory, for example, a random access memory (rRAM); or the memory may include a non-volatile memory, for example, a flash memory, a hard disk, or a solid-state drive (SSD); or the memory may include a combination of the foregoing types of memories.

An embodiment of this application further provides a computer storage medium storing a computer program, and the computer program is used to perform the roaming charging method according to the foregoing embodiments.

An embodiment of this application further provides a computer program product including an instruction. When the computer program product is run on a computer, the computer is enabled to perform the roaming charging method according to the foregoing embodiments.

An embodiment of this application further provides a roaming charging system. The roaming charging system includes the home charging device, the blockchain network, the service statistics database, the visited statistics collection device, and the visited charging device in FIG. 2. For an interaction process of the devices in the roaming charging system, refer to the descriptions in FIG. 2. Details are not described herein again.

An embodiment of this application further provides a roaming charging system. The roaming charging system includes the home charging device, the blockchain network, the visited statistics collection device, and the visited charging device in FIG. 3. For an interaction process of the devices in the roaming charging system, refer to the descriptions in FIG. 3. Details are not described herein again.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk storage, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. A roaming charging method, comprising:
receiving, by a home charging device from a blockchain network, one or more of a roaming account balance, a roaming charging rule, and a roaming service statistics abstract that are for a user;
receiving, by the home charging device, roaming service statistics for the user from a service statistics database;
verifying, by the home charging device, that an abstract obtained based on the roaming service statistics for the user matches the roaming service statistics abstract; and
verifying, by the home charging device based on the roaming service statistics and the roaming charging rule, correctness of the roaming account balance;
wherein before receiving the one or more of the roaming account balance, the roaming charging rule, and the roaming service statistics abstract, the method further comprises sending, by the home charging device, a request message to the blockchain network, wherein the request message carries a user identifier of the user and a channel identifier, and the request message indicates a request for one or more of the roaming account balance, the roaming charging rule, and the roaming service statistics abstract that are for the user from a channel indicated by the channel identifier.

2. The method according to claim 1, wherein before sending the request message, the method further comprises:
determining, by the home charging device, an initial roaming account balance for the user based on a home account balance for the user; and
sending, by the home charging device to the blockchain network, the initial roaming account balance for the user and the channel identifier corresponding to the user, wherein a plurality of peer nodes on the channel indicated by the channel identifier store one or more of the initial roaming account balance, the roaming charging rule, and the roaming service statistics abstract in a form of a blockchain.

3. The method according to claim 1, wherein verifying, by the home charging device based on the roaming service statistics and the roaming charging rule, correctness of the roaming account balance if further based on the roaming service statistics from the blockchain network being the same as the roaming service statistics from the service statistics database.

4. The method according to claim 1, wherein the home charging device is deployed in a home public land mobile network (HPLMN).

5. The method according to claim 1, wherein the home charging device communicates with the blockchain network by using a B1 interface.

6. The method according to claim 1, wherein the method further comprises, before sending, by the home charging device, a request message to the blockchain network, the home charging device obtains the channel identifier from a home policy control device.

7. The method according to claim 1, wherein the home charging device stores the channel identifier locally.

8. A home charging apparatus, comprising:
a processor;
a non-transitory memory storing a program to be executed in the processor; and
a transceiver, wherein the transceiver is configured to
receive, from a blockchain network, one or more of a roaming account balance, a roaming charging rule, and a roaming service statistics abstract that are for a user,
receive roaming service statistics for the user from a service statistics database; and
send a request message to the blockchain network, wherein the request message carries a user identifier for the user and a channel identifier, and the request message includes a request for one or more of the roaming account balance, the roaming charging rule, and the roaming service statistics abstract that are for the user from a channel indicated by the channel identifier; and
the program comprises instructions to: verify that an abstract obtained based on the roaming service statistics for the user matches the roaming service statistics abstract; and verify, based on the roaming service statistics and the roaming charging rule, correctness of the roaming account balance.

9. The apparatus according to claim 2, wherein
the program comprises further instructions to determine an initial roaming account balance for the user based on a home account balance for the user, wherein the initial roaming account balance for the user is less than or equal to the home account balance for the user; and
the transceiver is further configured to send the initial roaming account balance for the user and the channel identifier corresponding to the user to the blockchain network, wherein a plurality of peer nodes on the channel indicated by the channel identifier store one or more of the initial roaming account balance, the roaming charging rule, and the roaming service statistics abstract in a form of a blockchain.

10. The home charging apparatus according to claim 8, wherein the instructions to verify, based on the roaming service statistics and the roaming charging rule, correctness of the roaming account balance are further based on the roaming service statistics from the blockchain network being the same as the roaming service statistics from the service statistics database.

11. The home charging apparatus to claim 8, wherein the home charging device is deployed in a home public land mobile network (HPLMN).

12. The home charging apparatus according to claim 8, wherein the home charging device communicates with the blockchain network by using a B1 interface.

13. The home charging apparatus according to claim 8, wherein the transceiver is further configure to, before sending, by the home charging device, a request message to the blockchain network, receive the channel identifier from a home policy control device.

14. The home charging apparatus according to claim 8, wherein the home charging device stores the channel identifier locally.

15. A roaming charging system, comprising:
a home charging device,
a visited service statistics collection device,
a visited charging device,
a service statistics database,
wherein the home charging device is configured to:
receive, from a blockchain network, one or more of a roaming account balance, a roaming charging rule, and a roaming service statistics abstract that are for a user;
receive, from the service statistics database, roaming service statistics for the user;
verify that an abstract obtained based on the roaming service statistics for the user matches the roaming service statistics abstract; and
verify, based on the roaming service statistics and the roaming charging rule, correctness of the roaming account balance;
wherein the visited service statistics collection device is configured to:
determine the roaming service statistics for the user;
send the roaming service statistics for the user to the visited charging device;
send the roaming service statistics for the user to the service statistics database;
perform a hash operation on the roaming service statistics for the user, to obtain the roaming service statistics abstract; and
send, to the blockchain network, the roaming service statistics abstract;
wherein the visited charging device is configured to:
receive, from the visited service statistics collection device, the roaming service statistics for the user;
update, based on the roaming service statistics and the roaming charging rule for the user, an initial roaming account balance for the user, to obtain the roaming account balance; and
send the roaming account balance for the user to the blockchain network; and
wherein the service statistics database is configured to:

receive, from the visited service statistics collection device, the roaming service statistics for the user; and send the roaming service statistics for the user to the home charging device.

16. The system according to claim 15, further comprising the blockchain network configured to:

receive the roaming service statistics abstract for the user from the visited service statistics collection device;

store the roaming service statistics abstract for the user;

receive, from a visited charging device, the roaming account balance, and the roaming charging rule that are for the user;

store one or both of the roaming account balance and the roaming charging rule; and send one or more of the roaming account balance, the roaming charging rule, and the roaming service statistics abstract to the home charging device.

17. A non-transitory computer-readable storage medium storing a program to be executed by a processor, the program including instructions for:

receiving, by a home charging device from a blockchain network, one or more of a roaming account balance, a roaming charging rule, and a roaming service statistics abstract that are for a user;

receiving, by the home charging device, roaming service statistics for the user from a service statistics database;

verifying, by the home charging device, that an abstract obtained based on the roaming service statistics for the user matches the roaming service statistics abstract; and verifying, by the home charging device based on the roaming service statistics and the roaming charging rule, correctness of the roaming account balance; and sending, before receiving the one or more of the roaming account balance, the roaming charging rule, and the roaming service statistics abstract, by the home charging device, a request message to the blockchain network, wherein the request message carries a user identifier of the user and a channel identifier, and the request message indicates a request for one or more of the roaming account balance, the roaming charging rule, and the roaming service statistics abstract that are for the user from a channel indicated by the channel identifier.

18. The non-transitory computer-readable storage medium according to claim 17, wherein program including instructions for, before sending the request message:

determining, by the home charging device, an initial roaming account balance for the user based on a home account balance for the user; and sending, by the home charging device to the blockchain network, the initial roaming account balance for the user and the channel identifier corresponding to the user, wherein a plurality of peer nodes on the channel indicated by the channel identifier store one or more of the initial roaming account balance, the roaming charging rule, and the roaming service statistics abstract in a form of a blockchain.

19. The non-transitory computer-readable storage medium according to claim 17, wherein the instructions to verify, based on the roaming service statistics and the roaming charging rule, correctness of the roaming account balance are further based on the roaming service statistics from the blockchain network being the same as the roaming service statistics from the service statistics database.

20. The non-transitory computer-readable storage medium to claim 17, wherein the home charging device is deployed in a home public land mobile network (HPLMN).

21. The non-transitory computer-readable storage medium according to claim 17, wherein the home charging device communicates with the blockchain network by using a B1 interface.

22. The non-transitory computer-readable storage medium according to claim 17, wherein the instructions further comprise instructions for receiving, before sending by the home charging device a request message to the blockchain network, the channel identifier from a home policy control device.

* * * * *